United States Patent [19]
Adzima et al.

[11] Patent Number: 5,998,029
[45] Date of Patent: Dec. 7, 1999

[54] NONAQUEOUS SIZING SYSTEM FOR GLASS FIBERS AND INJECTION MOLDABLE POLYMERS

[75] Inventors: Leonard Joseph Adzima, Pickerington; David Lee Shipp, Newark; Andrew Bencich Woodside; David George Miller, both of Pickerington, all of Ohio; Catherine Ashley Barron, Renton, Wash.

[73] Assignee: Owens Corning Fiberglas Technology, Inc., Summit, Ill.

[21] Appl. No.: 08/885,882

[22] Filed: Jun. 30, 1997

[51] Int. Cl.$^6$ ............... B32B 9/00; C08L 77/00; C08F 20/00

[52] U.S. Cl. ............ 428/392; 428/375; 428/378; 428/391; 525/106; 525/398; 525/431; 525/446; 525/461; 525/537

[58] Field of Search ............... 525/106, 398, 525/431, 446, 453, 461, 537; 428/375, 378, 392, 391

[56] References Cited

U.S. PATENT DOCUMENTS

| | | |
|---|---|---|
| 2,272,588 | 2/1942 | Simison . |
| 3,644,245 | 2/1972 | Flanagan et al. . |
| 3,837,892 | 9/1974 | Marzocchi . |
| 3,997,306 | 12/1976 | Hedden . |
| 4,088,468 | 5/1978 | Roberson . |
| 4,136,069 | 1/1979 | Vachon et al. . |
| 4,173,680 | 11/1979 | Vachon et al. . |
| 4,248,936 | 2/1981 | Marzocchi et al. . |
| 4,298,653 | 11/1981 | Maaghul . |
| 4,500,600 | 2/1985 | Wong et al. . |
| 4,530,860 | 7/1985 | Johnson . |
| 4,537,917 | 8/1985 | Hergenrother . |
| 4,562,115 | 12/1985 | Hergenrother . |
| 4,567,102 | 1/1986 | Pollet et al. . |
| 4,581,392 | 4/1986 | Armstrong et al. . |
| 4,604,325 | 8/1986 | Pollet et al. . |
| 4,609,591 | 9/1986 | Pollet et al. . |
| 4,774,135 | 9/1988 | Bryant . |
| 4,840,755 | 6/1989 | Nakazawa et al. . |
| 4,853,021 | 8/1989 | Soszka et al. . |
| 5,011,523 | 4/1991 | Roncato et al. . |
| 5,071,675 | 12/1991 | Gupta et al. . |
| 5,071,914 | 12/1991 | Zimmel et al. . |
| 5,156,913 | 10/1992 | Collins et al. . |
| 5,352,392 | 10/1994 | Johnson et al. . |
| 5,378,746 | 1/1995 | Beyrle et al. . |
| 5,425,796 | 6/1995 | Loubinoux et al. . |

FOREIGN PATENT DOCUMENTS

| | | |
|---|---|---|
| 54106626 | 8/1979 | Japan . |
| 54120737 | 9/1979 | Japan . |
| 56078455 | 6/1981 | Japan . |
| 880909 | 10/1961 | United Kingdom . |

*Primary Examiner*—William Krynski
*Assistant Examiner*—J. M. Gray
*Attorney, Agent, or Firm*—Inger H. Eckert

[57] ABSTRACT

A nonaqueous sizing for glass fibers useful for reinforcement of polymers. The sizing composition comprises one or more film formers miscible with the polymer to be reinforced and one or more coupling agents. The sizing composition of the invention provides a glass fiber which may be wirecoated with the polymer to be reinforced, eliminating the need for extrusion or pultrusion processing to make glass/polymer composite fibers, compound or pellets.

18 Claims, 1 Drawing Sheet

NONAQUEOUS SIZING SYSTEM FOR GLASS FIBERS AND INJECTION MOLDABLE POLYMERS

TECHNICAL FIELD AND INDUSTRIAL APPLICABILITY OF THE INVENTION

The present invention provides a nonaqueous sizing composition to be used in the manufacture of glass fibers for the reinforcement of polymers such as nylon and polypropylene. The invention further relates to a nonaqueous sizing composition that can be applied hot directly to glass fibers in the forming process to provide a roving with more sizing. In particular, the sizing composition allows for a higher sizing level in the glass fiber so that it is now easier for the matrix resin to combine with the glass fiber. In addition, the invention is directed toward the production of thermoplastic resin pellets containing glass fibers at a much higher rate and greatly reduced cost. Specifically, the sizing improves the efficiency of wetout, thereby improving the wirecoating process and making it a preferable means of manufacturing pellets. Moreover, the invention allows for wirecoating of the sized glass fiber by the polymer to be reinforced, thus eliminating the need for extrusion or pultrusion processing to make the glass/polymer composite fibers or pellets. The invention also provides for a high size loading roving that allows glass and thermoplastics to combine more efficiently with even dispersion of the glass fibers within the polymer.

BACKGROUND OF THE INVENTION

Sizing compositions are well known and widely used in the manufacture of glass or carbon fibers to improve their processing properties, such as: fiber bundle cohesion, bundling, spreadability, resistance to fuzz formation, fiber smoothness and softness, abrasion resistance and easy and nondestructive unwindability of bobbined fiber bundles. Sizing compositions also affect the physical properties of the composite containing the treated fibers.

The reinforced plastic industry has been using glass fibers in various forms for reinforcing polymeric matrices to produce a variety of products. Glass fibers have been used in the form of continuous or chopped filaments, strands and rovings, as well as woven and nonwoven fabrics, meshes and scrims to reinforce polymers. Thermoplastic polymeric matrices have been reinforced with a variety of different forms of glass fibers resulting in the production of products such as: sheet molding compounds, bulk molding compounds, pultrusion products, panel products, spray up molding products, etc.

Production of glass fibers for the polymeric reinforcement market involves, attenuation of the glass fibers from molten streams of fiberizable glass material from a bushing or like device connected to a furnace containing molten fiberizable glass material. The glass fibers are attenuated by conventional means such as winders or high pressure air jets. In the process of producing glass fibers, a chemical composition is applied to them shortly after they are attenuated as the molten streams of glass. Prior to the present invention, the chemical composition has traditionally been an aqueous solution, foam or gel composition containing film forming polymeric materials, coupling or keying agents, lubricants and sometimes processing aids. This chemical composition or sizing is necessary in order to retard inter filament abrasion of the glass fibers when they are gathered into a bundle of glass fibers or strands. It is also required in order to make the glass fibers compatible with polymer matrices that they are used to reinforce. After application of the sizing, the fibers are then dried either in the package form or in the chopped strand form before they are used for reinforcement.

Prior to the present invention, the next step in using glass fibers as reinforcement for molded polymers involved production of either a short fiber composite or a long fiber composite. In general, the production of short fiber composites involved mixing pure polymer pellets with the chopped glass fibers such that the glass fibers were dispersed throughout the polymer when extruded. Pultrusion is used to produce long fiber composites where hot, thermoplastic polymer is forced through the glass roving so as to make the composite. This process method for manufacturing the glass polymer composite is expensive and very slow mainly due to high viscosity of thermoplastic polymer.

Chopped glass fibers are commonly used as reinforcement materials in thermoplastic articles. Typically, such fibers are formed by pulling molten glass into filaments through a bushing or orifice plate, applying a sizing composition containing lubricants, coupling agents and film forming binder resins to the filaments, gathering the filaments into strands, chopping the fiber strands into segments of the desired length and drying the sizing composition. These chopped strand segments are thereafter mixed with a polymerizable resin, and the mixture is supplied to a compression or injection molding machine to be formed into glass fiber reinforced plastic articles. Typically, the chopped strands are mixed with pellets of a polymerizable thermoplastic resin, and the mixture is supplied to an extruder wherein the resin is melted, and mixed with the chopped strands thus, the integrity of the glass fiber strands is destroyed and the fibers are dispersed throughout the molten resin, the fiber length is decreased and the fiber/resin dispersion is formed into pellets. These pellets are then fed to the molding machine and formed into molded articles having a substantially homogeneous dispersion of the glass fibers throughout.

Unfortunately, however, chopped glass fibers made via such processes are typically bulky and do not flow well. Consequently, such fibers are sometimes difficult to handle and have, on occasion been problematic in automated processing equipment.

Most attempts for improving the process have been directed toward compacting the chopped strands. The work was aimed at improving flowability of the chopped strands which would presumably enable the use of automated equipment to weigh and transport the glass fibers for mixing with thermoplastic resins.

Such a process is disclosed in U.S. Pat. No. 4,840,755, wherein wet chopped strands are rolled, preferably on a vibrating carrier, to round the strands and compact them into denser cylindrically-shaped pellets. However, while the disclosed methods do tend to provide denser, more cylindrically-shaped pellets exhibiting better flowability, the disclosed methods and apparatus are undesirably limited in certain respects. For example, the pellet size and fiber content is generally limited by the size and number of fibers in the chopped strand. Although separated strands or loose filaments reportedly adhere to other strands during the rolling process, the process is designed to avoid multiple chopped strand segments from adhering together to form pellets containing more fibers than are present in a single chopped strand. Consequently, to obtain pellets having a suitable bulk density and a sufficient ratio of diameter to length to exhibit good flowability, the strand from which the segments are chopped usually must be formed from a large number of filaments. However, increasing the number of filaments required to be formed and combined into a single strand undesirably complicates the forming operation.

Although the disclosed pellets can be made by such diverse mixing processes, it has been discovered that many of such processes are either too inefficient to be used commercially, or cannot be adequately controlled to produce a uniform pellet product that provides the resulting composite article with strength characteristics comparable to those made from nonpelleted chopped strand fibers. For example, the use of a modified disk pelletizer as described in U.S. Pat. No. 4,840,755 frequently results in excessive residence time of the formed pellets within the mixer, which results in degradation of the pellets due to the abrasive nature of glass fiber pellets rubbing against one another. Such pellet degradation ultimately reduces the strength characteristics of the molded articles made therewith.

Accordingly, a need exists for a totally new approach that eliminates the need for handling the chopped glass fibers prior to mixing with the resin. Such a need is fulfilled by the process and composition of the invention described below.

In addition, the previous methods of processing fibers with sizing have required that ovens be used in the process so as to dry the treated fibers. Aqueous sizings also contain a significant amount of volatile organic components (VOCs). The industry, in an effort to prevent environmental problems, has been attempting to find ways of minimizing levels of VOCs while maintaining the physical properties of the fibers.

The present invention of a nonaqueous sizing composition used to make square edged continuous roving packages surprisingly not only meets and exceeds environmental concerns over VOCs, but it also significantly reduces the amount of time required as well as the overall cost of producing the treated fibers by eliminating the need for drying ovens and package stripback (normally due to excessive size migration). In addition, the present invention provides a sizing composition that once applied to a glass fiber allows for the glass fiber to be directly wirecoated with the polymeric material to be reinforced. This overcomes the previous drawback of long fibers having a costly and slow glass impregnation process. Specifically, the high loading of size enables the glass strand to be dispersed evenly within the polymer during the molding process.

SUMMARY OF THE INVENTION

The present invention surprisingly provides a nonaqueous sizing composition having an LOI (loss on ignition) ranging from 2–10%. Prior to the discovery of the present invention, application of a sizing level in such a range was unattainable due to size sling-off, migration, package hang-on and drying problems. However, this invention provides a sizing that is applied at high temperatures directly to glass fibers in the fiber forming environment resulting in a shippable roving package in one step with no oven drying, no migration and no stripback. The composition of the sizing allows for the production of a long fiber composite material. Specifically, the sizing composition of the invention results in a high size loading glass roving which may subsequently be wirecoated at high speeds, possibly as high as 1000 ft/min, with thermoplastic polymer and chopped into pellets.

One embodiment of a nonaqueous sizing of the present invention contains one or more film formers which are miscible with the polymer to be reinforced and one or more coupling agents. The sizing contains no water and is applied at high temperatures.

Since the present invention is a nonaqueous sizing, the resins are not emulsified or mixed with solvents, therefore, the VOCs are significantly reduced. In addition, in the present invention the coupling agents, or more particularly, the silanes are not mixed in water; this in some cases reduces hydrolization and may decrease the release of VOCs into the production environment.

Another embodiment of the present invention provides a process for the in line manufacturing of composite materials. The process involves application of the nonaqueous sizing with the subsequent wirecoating of the glass fiber in line which is then cooled, chopped and shipped.

DETAILED DESCRIPTION AND PREFERRED EMBODIMENTS OF THE INVENTION

Figure 1:
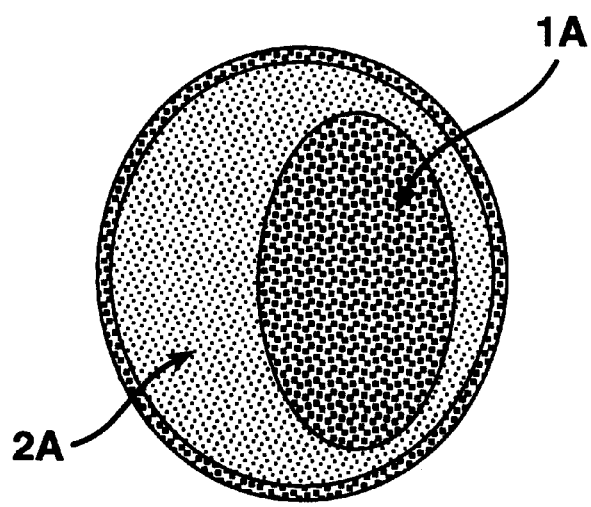
FIGS. 1 and 2 illustrate a pellet cross section comparison of the present invention wirecoated long fiber composite (FIG. 1) versus the prior art fully impregnated glass fiber compound known as Celstran™ N66G50 (FIG. 2). Fiber A (FIG. 1) shows a roving of the present invention with 4% size by weight, relative to the glass, and 2% size relative to the total long fiber compound wire-coated with NYLON, a polyamide. Item 1A represents a 4000 filament bundle having 4% size in the glass. Item 2A demonstrates the NYLON wirecoating to be 48% of the total fiber by weight. Fiber B (FIG. 2) shows a cross-section of a pellet of Celstran™ N66G50 long fiber compound to be homogenous. Item 1B is a 4000 filament bundle having 0.5% size on the glass and 0.25% size by weight relative to the total fiber.
Figure 2:
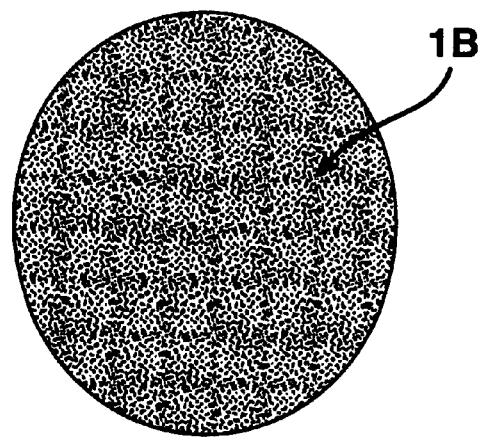

The nonaqueous sizing composition of the present invention is comprised of one or more film formers and one or more coupling agents. The preferred film former should be a solid at room temperature and melts in the range of 30–60° C. and is a liquid at 100° C. with a viscosity of 75–400 CPs.

The preferred coupling agent should be a liquid at room temperature and have a boiling point of greater than 100° C. Suitable coupling agents include organofunctional silanes, 3-glycidoxypropylltrimethoxy silane and 3-methacryloxypropyltrimethoxy silane. The preferred coupling agent for use in the invention is 3-aminopropyltriethoxy silane commercially available from OSi Specialties of Witco under the trade designation A-1100. Preferably, the organofunctional silanes are used in an amount of from about 0.1 to 5 percent of the sizing composition.

Film formers useful in the invention include film formers miscible with the polymer to be reinforced. For example, with nylon, suitable film formers include polycaprolactones such as Tone 0310 and 0260 obtained form Union Carbide. For reinforcing polypropylenes, suitable film formers include amorphous waxes such as Vybar 260 and 825 obtained from Petrolite.

In addition to the required components needed to prepare the invention, other components normally added to glass or carbon fiber sizing compositions can also be present. For example, the sizing composition of the invention may contain antistatic agents, cross-linking agents or hardeners, antioxidants, cationic lubricants for reducing fuzzy or broken filaments, nonionic lubricants, nucleating agents, or small amounts of pigment, etc. An example of a cross-linking agent would be bis-silane.

In the process of the invention, a strand of substantially continuous glass fibers is formed by conventional techniques such as drawing molten glass through a heated bushing to form a multitude of substantially continuous glass fibers and collecting the fibers into a strand. Any apparatus known in the art for producing such fibers and collecting them into a strand can suitably be used in the present invention. Suitable fibers are fibers having a diameter of from about 10 to 30 microns, and suitable strands containing from about 50 to 45000 fibers. Preferably, the strands formed in the process of the invention contain from about 4000 to 5000 their having a diameter of from about 17 to 25 microns.

The nonaqueous sizing composition can be applied to the glass or carbon fibers by any method known to those skilled in the art such as during the formation of the glass fibers or after the glass fibers have cooled to a sufficient temperature to allow the application of the nonaqueous sizing composition. The nonaqueous sizing composition can be applied to glass fibers by applicators having belts, rollers, sprayors, and hot melt applicators.

Preferably the sizing composition is applied by a heated applicator which is capable of applying or metering small amounts of sizing uniformly to a continuous glass strand. Stationary and dual roll applicators may be used, however, the preferred applicators are ¾" roll-slot size applicator, ⅜" roll-slot size applicator, dual roll applicator and multiple split slot applicator. The most preferred is a ¾" roll-slot size applicator.

The ¾" roll-slot applicator typically has a ¾ inch diameter with a graphite or steel roll; the bottom block is heated. This applicator provides a single pass size flow with reduced drag compared to a standard applicator such as those typically used in the art. With this applicator there is also the advantage that the roll speed is adjustable via the gear train and inverter drive. In addition, it is well suited for viscosities in the 50–400 CPs range and handles add-on rates in the 0.5 to 8% range or higher.

A ⅜" roll-slot applicator differs in that the roll diameter is ⅜" and the bottom block is heated. This applicator also provides a single pass size flow with slightly lower drag compared to a ¾" roll-slot. Like the ¾" applicator, the roll speed is adjustable via the gear train and inverter drive. In addition, this applicator has been shown to be useful for viscosities in the 50–400 cps range while handling add-on rates of from about 0.3 to 3% or higher.

An apparatus is provided for producing sized glass fibers. The apparatus comprises: a heated bushing for supplying streams of molten glass to be drawn into continuous fibers; a device adapted to draw the streams into the fibers; and a sizing applicator. The sizing applicator includes a housing and a roll applicator which is rotatably coupled to the housing. The housing has a supply port adapted to receive sizing composition under pressure from a sizing supply source, an exit slot and a passageway extending from the supply port to the exit slot. The passageway receives sizing composition from the supply port and delivers the sizing composition to the exit slot such that the sizing composition exits the housing and is received on an outer surface of the roll applicator. The roll applicator is spaced from the housing such that the housing does not substantially contact and alter sizing composition thickness of the sizing composition received on the roll applicator.

The roll applicator preferably rotates about a central axis which lies in a generally horizontal plane. The exit slot may be positioned above the horizontal plane such that the sizing composition exits the housing and is received on the outer surface of the roll applicator above the horizontal plane.

The roll applicator further includes first and second end portions. In one embodiment, the first end portion has first spirals or threads and the second end portion has second spirals or threads. The first and second spirals are of opposite hands so as to divert sizing composition which contacts the first and second end portions inwardly as the roll applicator rotates. Preferably, the passageway has a cross-sectional area which is generally constant from the supply port to the exit slot.

The apparatus further includes drive apparatus for effecting rotation of the roll applicator. The drive apparatus comprises a motor assembly and a clutch assembly. The motor assembly includes a motor having an output shaft and a drive pulley coupled to the output shaft so as to rotate with the output shaft. The clutch assembly includes: a clutch housing; a first shaft rotatably mounted in the housing and including an inner bore; a second shaft positioned in the bore and including an annular shoulder and a distal end portion adapted to engage the roll applicator such that rotation of the second shaft effects rotation of the roll applicator; a spring positioned in the bore and engaging the annular shoulder of the second shaft; a spring retainer secured to the first shaft so as to rotate with the first shaft and engaging and retaining the spring in the bore; and a belt positioned about the drive pulley and a portion of the first shaft such that rotation of the drive pulley effects rotation of the first shaft. The spring effects rotation of the second shaft upon rotation of the first shaft. The portion of the first shaft may comprise a drive pulley mounted to the first shaft.

The distal end portion of the second shaft preferably includes a pin which extends generally transversely to a central axis of the second shaft. The pin is adapted to engage a pin-receiving notch provided in the roll applicator.

In accordance with a second aspect of the preferred apparatus, a sizing applicator is provided for applying a coating of sizing composition to glass fibers. The applicator comprises a housing and a roll applicator which is rotatably coupled to the housing. The housing has a supply port adapted to receive sizing composition from a sizing supply source, an exit slot and a passageway extending from the supply port to the exit slot. The passageway receives sizing composition from the supply port and delivers the sizing composition to the exit slot such that the sizing composition exits the housing and is received on an outer surface of the roll applicator. The roll applicator is spaced from the housing such that the housing does not substantially alter sizing composition thickness of the sizing composition received on the roll applicator.

In accordance with a third aspect of the preferred apparatus, a sizing applicator is provided for applying a coating of sizing composition to glass fibers. The sizing applicator includes a housing and roll applicator which is rotatably coupled to the housing. The housing has a supply port adapted to receive sizing composition from a sizing supply source, an exit slot and a passageway extending from the supply port to the exit slot. The passageway receives sizing composition from the supply port and delivers the sizing composition to the exit slot such that the sizing composition exits the housing and is received on an outer surface of the roll applicator. The roll applicator is spaced from the housing such that the housing does not substantially contact the sizing composition once it is received on the roll applicator.

A dual roll applicator is useful when handling sizes having viscosities in the 1–200 CPs range while needing add-on rates in the 1–15% range. This type of applicator allows for precise control of film thickness.

The sizing is applied using a heated applicator capable of applying or metering small amounts 3–225 gm/min of sizing uniformly distributed to a glass strand. Preferably the applicator system has a diameter of from ¼ to 1" and is fed via an H series Zenith pump.

The nonaqueous sizing of the present invention may be applied at temperatures ranging from 30° C. to 150° C. Preferably, the sizing is applied in the range of 80° C. to 110° C. In a particularly preferred embodiment, the sizing is applied at 100 degrees centigrade.

The sizing may be applied at viscosities ranging from 75 to 400 CPs. Preferably, the sizing is applied in the range of 100 to 250. In a particularly preferred embodiment, the nonaqueous sizing is applied at a viscosity of about 200 CPs.

Another important variable is the amount of sizing to be applied to the glass. In traditional chopped strands the LOI % by weight of sizing on the glass or carbon fiber is 1% or less, with short fiber compounds normally being about 0.5% to 1% sizing. Thus the influence of the LOI on the matrix is relatively small. In contrast, the sizing of the present invention has a size amount that ranges from 2–10%. As a result, the function of the sizing is broadened such that not only does it provide good adhesion while offering protection and good processing characteristics, but it also becomes a significant component of the matrix. In particular, for the present invention, the large amount of size on the glass allows the wirecoated glass fiber to disperse evenly throughout the thermoplastic polymer during the molding process.

One method for determining the LOI to be used is to apply sizing in an amount sufficient to essentially fill the interstices of the glass strand. This requires a determination and measurement of the interstices. The calculation uses the density of the glass filament and the density of the sizing. The formula is as follows:

Area of a hexagon circumscribing a circle of radius $r = n*r*r*\tan(pi/6)$

Assume $r = 1$ cm

Area of hexagon (glass plus size)=3.4641 cm$^2$

Area of circle (glass)=pi cm$^2$

Area of size=3.4641=pi=0.3225 cm$^2$

Volume of each (assume height=1 cm)

size=0.3225 cm$^3$ glass=pi cm$^3$

Weight of size=(1 gm/cm$^3$) (0.3225 cm$^3$)=0.3225 gm

Weight of glass=(2.53 gm/cm$^3$) (pi cm$^3$)=7.948 gm

Total weight of size and glass=8.2707 gm

Percent by weight of size=3.9%

The sizing may be applied at amounts ranging from 2–10%. Preferable, the sizing is applied in the range of 2 to 5%. In a particularly preferred embodiment, the sizing is applied to a glass fiber for nylon reinforcement at an LOI of from 3.0 to 4.0% with the most preferred LOI being 3.5%. In a particularly preferred embodiment, the sizing is applied to a glass fiber for coupled polypropylene reinforcement at an LOI of from 2 to 5% with the most preferred LOI being 3.5%. However, as can be recognized from the discussion and formula above, the preferred LOI will vary with the glass filament density and sizing density. For example, a 23 micron filament has a preferred LOI of about 3.5%; whereas a 20 micron filament has a preferred LOI of about 4.1%; a 16 micron filament has a preferred LOI of about 5.0%; and a 13 micron filament has a preferred LOI of about 6.2%. Thus, with more surface per gram of glass, more sizing is needed.

Another aspect of the sizing chemistry is the requirement that the materials be able to withstand the wirecoating process without undergoing degradation. There is the potential for sizing to begin losing mass when exposed to temperatures used in wirecoating and injection molding processes. Thus, the sizing chemistry must be able to withstand the temperatures encountered in those operations at up to 250–600 degrees Fahrenheit and 120–315 degrees Celsius, the process temperatures for wirecoating and injection molding.

Thus, in one embodiment, a sizing composition for treatment of glass fibers is provided comprising: one or more film formers miscible with the polymer to be reinforced or used for wirecoating and one or more coupling agents. The film former may be any film former which is of sufficient molecular weight to be essentially nonvolatile, has a viscosity range of 50–400 cps at 100° C. and is compatible with the thermoplastic matrix. For example, a film former such as polycaprolactone would be used so as to be miscible with a molding compound such as NYLON 66, a polyamide having a repeating unit comprising two carbon chains, each chain containing 6 carbon atoms. The coupling agents may be any ones which are compatible with the film formers selected. For example, coupling agents compatible with polycaprolactone film formers would be various amine functional silanes.

Coupling agents suitable for the nonaqueous sizing composition will generally have ethoxy hydrolizable groups or silicon, since those having a methoxy group generally give off a more dangerous material when hydrolized. In addition, coupling agents are chosen so as to avoid any significant chemical side reactions.

After application of the sizing, the glass fiber is then made into the compound by wirecoating the continuous roving in-line or off-line with polymer. The resulting glass fiber composite is then chopped into pellets and shipped to the molder.

Wirecoating is done by passing continuous roving through a wirecoating die. The die is attached to an extruder which supplies molten thermoplastic polymer through an opening perpendicular to the direction of the roving through the die. The action of the thermoplastic is to basically encapsulate the roving which is the "wire" to be coated. The speed that the roving is pulled and the feed rate of the extruder determines the amount of thermoplastic that surrounds the roving. The die exit hole size also determines the amount of thermoplastic that surrounds the roving. Another important variable is the viscosity of the thermoplastic which is controlled by the temperature.

Prior to the actual wirecoating of the glass fiber, in a system where the glass is coated with polypropylene, the polypropylene pellets are hand mixed with a polypropylene additive having maleated reactive groups suitable to aid the bonding of the polypropylene to the glass. A preferred additive is Polybond (PB-3001) obtained from UniRoyal Chemical. The additive is mixed with the polypropylene, by hand, in an amount from about 2 to 15% and preferably 10%.

Once formed, the strand is chopped into lengths of from about ⅛ inch to 1¼ inch. Any suitable means known in the art of chopping glass fiber polymer strands into such lengths can be used in the process. Suitable fiber chopping devices include Conair-Jetro model #204T 90060, Bay City, Mich.

EXAMPLE I

Nonaqueous Sizing for Nylon Glass Fiber Composites

The sizing formula is as shown below (designated N1):

|  | Actual Amt. Used |
|---|---|
| R-5762 (polyester alkyd) | 49.5% |
| TONE 0260 (polycaprolactone) | 49.5% |
| A-1100 (amine based silane) | 1.0% |
|  | 100% |

The polyester alkyd, R-5762, was prepared as follows:

TABLE 1

R-5762 - Polyester alkyd characterization

Starting Materials:

1. propoxylated bis-phenol A
2. maleic anhydride

Composition of R-5762 Polyester

| Monomers in Polyester | | | |
|---|---|---|---|
| 1. maleic acid | 0.4% by wt | | |
| 2. fumaric acid | 0.04% by wt | | |
| 3. propoxylated bis-phenol A | 34.3% by wt | | |
|  |  | RI detector | UV detector |
| No. avg. molecular weight, $M_n$ |  | 550 | 510 |
| Wt. Avg. molecular weight, $M_w$ |  | 620 | 600 |
| Z avg. molecular weight, $M_z$ |  | 750 | 710 |
| polydispersity, d |  | 1.13 | 1.17 |
| VOC, % | 0.74 | | |
| Acid # | 60.3 | | |
| Visc, ICI, cp | 140 | | |

The water content, percent by weight is: 0.01–0.06%. The flash point is: greater than 400° F. The viscosity at 25° C. is 3,200,000. The size formulation is a solid at 25° C. and has the following temperature viscosity relationship.

| Temperature in ° C. | Viscosity, CPS |
|---|---|
| 75 | 660 |
| 100 | 260 |
| 125 | 120 |
| 150 | 60 |

The TONE 0260 (polycaprolactone) was obtained from Union Carbide and has the following formula:

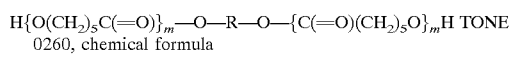

H{O(CH$_2$)$_5$C(=O)}$_m$—O—R—O—{C(=O)(CH$_2$)$_5$O}$_m$H TONE 0260, chemical formula Table 2 gives it characteristics.

TABLE 2

TONE 0260

| Molecular weight | 3000 | Acid No. mg KOH/g | 0.09 |
|---|---|---|---|
| Melting point C | 50–60 | Viscosity, 55C, cps | 1500 |
| Hydroxyl No. mg KOH/g | 37 | VOC, % | 0.29 |

The A-1100 silane was obtained from OSi Specialties and has the following formula and characteristics:

| gamma-aminopropyltriethoxysilane H$_2$NCH$_2$CH$_2$CH$_2$Si(OEt)$_3$ | |
|---|---|
| Molecular weight | 221.4 |
| Specific gravity | 0.946 |
|  | Clear liquid |

The sizing was heated in a bucket and pumped to a suitable applicator, a dual roll type. The glass fibers were attenuated and allowed to contact the applicator; and the sizing, at about 115° C., was then transferred to the glass. The fibers were gathered at the primary shoe and wound onto a collect making a square edged package. The package was then allowed to cool. It was then wirecoated and chopped into pellets for eventual use in injection molding applications.

TABLE 3

N1 LONG FIBER NYLON SIZE

SECTION 1 - PURCHASING SPECIFICATION AND NFPA SAFETY RATINGS

| MATERIAL | NFPA HEALTH | NFPA FLAMMABILITY | NFPA REACTIVITY |
|---|---|---|---|
| R-5762 | 2 | 1 | 0 |
| TONE 0260 | 1 | 1 | 0 |
| A-1100 | 3 | 1 | 2 |

SECTION 2 - FORMULATION

| MATERIAL | % ACTIVE SOLIDS | % BY WEIGHT AS RECEIVED | LBS/100 LB AS RECEIVED |
|---|---|---|---|
| R-5762 | 100 | 49.5 | 49.5 |
| TONE 0260 | 100 | 49.5 | 49.5 |
| A-1100 | 61 | 1 | 1 |

Tolerances

Weights listed above are target weights. +/−2% variation of target weight is acceptable for this formulation.

The size should be maintained at room temperature during storage. When using the sizing, the equipment for handling should be made from FRP (fiber glass reinforced plastic), PVC, stainless steel or glass. Black or galvanized iron and most nonferrous metals are prohibited. When mixing the size, preparation should be carried out as follows. In a main mix tank, the drum or pail of R-5762 should be heated to 100° C. It should then be weighed and directly added into the main mix tank; then the agitation should begin. Subsequently, the TONE 0260 should be added directly to the main mix tank as a solid with a temperature of 70° C. being maintained. An alternative method is for the TONE 0260 to be heated to 80° C. and poured directly into the main mix. At a temperature of 70° C. +/−5° C., the A-1100 silane should be added slowly with constant stirring. Agitation should be maintained until dispersion is complete. Once this is finished, the mixing is complete. For a final mix, agitation should be for 5–10 minutes to achieve dispersion and then viscosity should be measured by a Brookfield or cone and plate measurement at 100° C.

TABLE 4

Sizing for Nylon
Status:
Designation: N1

|  | N1 | STANDARD |
|---|---|---|
| LOI | 5.0% | 0.5% |
| Pkg. Dens., lb/in³ | 0.065 | 0.067 |
| Strand Ten., ksi | 327 (25) | 341 (19) |
| Fuzz, mg | 10–15 | <15 |
| Pkg. Stability | good | excellent |
| Pkg. Runout | good | good |

TABLE 5

| Fiber Type | Tensile Strength (ksi) | Tensile Modulus (psi* 10⁶) | Notched Izod (ft-lb/in) | Glass Content (%) |
|---|---|---|---|---|
| Short Fiber 492A* 10 micron | 26.9 | 2.82 | 2.8 | 29.3 |
| Celstran ™ 16 micron | 23.6 | 2.78 | 4.2 | 27.7 |
| N1 19 micron | 23.7 | 2.78 | 4.1 | 29.5 |
| N1 23 micron | 22.6 | 2.87 | 4.2 | 30.5 |

*Obtained from Owens-Corning.

| | Ten. Strength (ksi) | Wet Ten. (ksi) | Flex. Strgth (ksi) | Notched Impact (ft-lb/in) | Unnotched Impact (ft/lb) |
|---|---|---|---|---|---|
| Celstran ™ (16 micron) | 34.2 | 20.4 | 55.6 | 5.2 | 24.9 |
| N1 (19 micron) | 29.4 | 16.1 | 47.9 | 4.3 | 14.7 |

EXAMPLE II

Another sizing was prepared for nylon glass fiber composites having the formula shown below (designated N2):

| | Actual amount used |
|---|---|
| Tone 0310 (polycaprolactone) | 99% by weight |
| A-1100 (amine silane) | 1% |

The Tone 0310 was obtained from Union Carbide and has the following formula:

Tone 0310 (polycaprolactone)
MW = 900
mp. = 27-32C
Hydroxyl # = 187

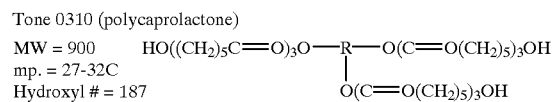

The sizing was prepared as in Example I and samples were prepared. A 23 micron fiber was made and tested against Celstran N66G50 (16 micron fiber used as a control). The mechanical properties were as follows below.

| | Mechnical Properties | |
|---|---|---|
| | Celstran N66G50 (control) | N2 |
| | M fiber (16 micron) | T fiber (23 micron) |
| Tensile, ksi | 35.3 | 30.4 |
| Tensile, 24 h boil, ksi | 22.5 | 18.4 |
| Flexural, ksi | 55.6 | 49.6 |
| Notched Izod ft-lbs/in | 6.04 | 6.41 |
| Unnotched, ft-lbs/in | 24.3 | 21.8 |
| % glass | 49.6 | 51.5 |

EXAMPLE III

Another sizing was prepared for nylon glass fiber composites. The formula was designated N3 and is shown below as:

| N3 | Actual amount used |
|---|---|
| Tone 0310 | 38.5% |
| Tone 0260 | 60.0% |
| A-1100 | 1.5% |

The sizing was prepared as in Example I and samples were prepared. A 23 micron fiber was prepared and tested against Celstran N66G50 (15 micron). The mechanical properties were as shown in Table 6 below.

TABLE 6

| | | Mechanical Property Data | | | | | | | | |
|---|---|---|---|---|---|---|---|---|---|---|
| FD microns | Description | Tensile dry ksi | Tensile modular (psi × 10⁶) | Tensile 24 hr boil ksi | % Ret. | Flexural strength ksi | Flexural modulus (psi × 10⁶) | Notch Izod (ft-lb/in) | Unnotch Izod (ft-lb) | Glass Content (%) | DTIL (def. F) |
| 16 | Celstran N66G50 | 36.7 | 2.62 | 21.5 | 59 | 57.0 | 2.14 | 5.7 | 29.1 | 49.4 | 500 |
| 23 | N3 T225 | 32.3 | 2.52 | 18.7 | 58 | 51.2 | 2.17 | 5.2 | 31.5 | 49.1 | 500 |

EXAMPLE IV

Nonaqueous Sizing for Coupled Polypropylene

The formulation for this example is (designated "P1"):
VYBAR 260—80%
VYBAR 825—18%
A-1100 Silane—2%

The sizing formulation was prepared by heating the VYBAR waxes to about 160° F. while blending them together. The silane was then added slowly and mixed thoroughly throughout the waxes. The size was applied hot at 180° F. to the glass fibers in forming on a 225 yd/lb sliver of 23 microns (the strand was pulled from a bushing having 2000 filaments) using a pump and ¾" roll applicator system. The sizing was applied in order to achieve a size loading of about 3.5%.

TABLE 7

TYPICAL PROPERTIES

|  | Molecular Weight | Polydispersity | Density @ 77° F. (25° C.) | Viscosity @ 210° F. (99° C.) | Softening Point | | Penetration @ 77° F. (25° C.) | Penetration @ 110° F. (44° C.) |
|---|---|---|---|---|---|---|---|---|
| Test Methods | Vapor Pressure Osmometry | $\overline{M}_w/\overline{M}_n$ | ASTM D792 | ASTM D3236 | ASTM D36 | | ASTM D1321 | ASTM D1321 |
| Units | $M_n$ | | grams/cc | cP | ° F. | ° C. | 0.1 mm | 0.1 mm |
| VYBAR © 260 Polymer | 2600 | 11.5 | 0.90 | 358 | 130 | 54 | 12 | 110 |
| VYBAR © 825 Polymer | 1500 | 3 | 0.86 | 795*** | −30* | −34* | — | — |

*Pour Point
**Gel Permeation Chromatography
***@ 90° F. (32° C.)

TABLE 8

| TR# 54887 | Tensile, ksi (s.d.) | Tensile mod. (10^6psi) | Elong. (%) | Tensile, 24 hr boil ksi (s.d.) | Ret. (%) | % glass |
|---|---|---|---|---|---|---|
| Celstran PPG550-02-4* control | 15.11 (0.4) | 1.63 | 1.50 | 10.99 (0.6) | 73 | 48.9 |
| Celstran PPG50-02-4 control | 14.65 (0.4) | 1.62 | 1.40 | 11.24 (0.9) | 77 | 49.0 |
| P1**, 1 end, 3.5% LOI | 14.48 (1.1) | 1.62 | 1.54 | 11.54 (1.0) | 80 | 47.9 |
| P1, 2 end, 3.5% LOI | 15.48 (0.5) | 1.76 | 1.65 | 11.81 (0.5) | 76 | 50.9 |
| P1, 1 end, 2% LOI | 14.86 (0.3) | 1.60 | 1.75 | 10.91 (0.7) | 73 | 47.5 |
| PI, 2 end, 2% LOI | 15.62 (0.5) | 1.59 | 1.90 | 11.83 (0.6) | 76 | 49.1 |

*Note Celstran is a commercial product used as a control.
**The P1 nonaqueous size formulation is a 23 micron filament diameter and the Celstran* is 16 microns.

EXAMPLE V

Another sizing was prepared for polypropylene glass fiber composites. The formula was designated P2 and is shown below as:

| P2 | Actual amount used |
|---|---|
| Vybar 260 | 80% |
| Vybar 825 | 19% |
| A-1100 | 1% |

The sizing was prepared as in Example IV and samples were prepared. Fibers were prepared at 16, 20 and 23 microns and tested against Celstran (16 micron). The mechanical properties were as shown in Table 9 below.

TABLE 9

Mechanical Property Data

| FD microns | Description | Tensile dry ksi | Tensile modular (psi × 10⁶) | Tensile 24 hr boil ksi | % Ret. | Flexural strength ksi | Flexural modulus (psi × 10⁶) | Notch Izod (ft-lb/in) | Unnotch Izod (ft-lb) | Glass Content (%) |
|---|---|---|---|---|---|---|---|---|---|---|
| 16 | Celstran, mold at 420 F | 16.4 | 1.14 | 13.8 | 84 | 23.4 | 0.81 | 4.2 | 15.3 | 30.5 |
| 23 | P2, mold at 460 F | 14.5 | 1.03 | 10.6 | 73 | 20.5 | 0.78 | 5.2 | 14.0 | 29.4 |
| 20 | P2, mold at 460 F | 14.9 | 1.05 | 10.3 | 69 | 21.8 | 0.78 | 5.0 | 15.1 | 28.7 |
| 16 | P2, mold at 460 F | 14.9 | 1.01 | 10.2 | 68 | 22.5 | 0.77 | 4.9 | 14.6 | 29.9 |

What is claimed:

1. A nonaqueous sizing for application to glass reinforcing fibers comprising:
   a) one or more film formers that are miscible with the polymer to be reinforced, the film former having a melting point in the range of from 30–60° C., and a viscosity of from 75–400 cPs; and
   b) from about 0.1 to 5% by weight of one or more coupling agents selected from the group consisting of silanes;
wherein the sizing has a loss on ignition rate of from 2–10% when it is applied to glass reinforcing fibers.

2. The nonaqueous sizing composition of claim 1, wherein said coupling agent is selected from the group consisting of 3-glycidoxypropyltrimethoxy silane, 3-methacryloxypropyltrimethoxy silane and 3-aminopropyltriethoxy silane.

3. The nonaqueous sizing composition of claim 1, wherein said film formers are selected from the group consisting of polyamide, polypropylene, polybutyl, terathalate, polyamide having a carbon chain containing 6 carbon atoms, polyamide having a repeating unit comprising two carbon chains, each chain containing 6 carbon atoms, chemically coupled polypropylene, polycarbonate, polyphenalene sulfide, thermoplastic polyurethane, acetal, and HDPE.

4. The nonaqueous sizing composition of claim 1, wherein said film formers are selected from the group consisting of high m.w. waxes, lower m.w. waxes, lower m.w. polyester alkyds, polycaprolactones, low m.w. maleated polypropylenes.

5. A nonaqueous sizing for application to glass fibers for reinforcing polyamide comprising:
   a) one or more film formers that are miscible with the polymer to be reinforced, the film former having a melting point in the range of from 30–60° C., and a viscosity of from 75–400 cPs; and
   b) one or more coupling agents selected from the group consisting of silanes;
wherein the sizing has a loss on ignition rate of from 2–10% when it is applied to glass fibers for reinforcing polyamide.

6. The nonaqueous sizing of claim 5, wherein said film former is selected from the group consisting of low m.w. polyurethanes, polycaprolactones, polyesters, unsaturated polyesters.

7. The nonaqueous sizing of claim 5, wherein said film formers are polycaprolactones; and coupling agent is amine silane.

8. A nonaqueous sizing composition for application to glass fibers for reinforcing polypropylene comprising:
   a) one or more film formers that are miscible with the polymer to be reinforced, the film former having a melting point in the range of from 30–60° C., and a viscosity of from 75–400 cPs; and
   b) one or more coupling agents selected from the group consisting of silanes;
wherein the sizing has a loss on ignition rate of from 2–10% when it is applied to glass fibers for reinforcing polypropylene.

9. The nonaqueous sizing of claim 8, wherein said film former is selected from the group consisting of amorphous waxes, microcrystaline waxes, maleated low molecular weight polypropylenes, hydrocarbon resins.

10. The nonaqueous sizing of claim 8, wherein said film formers are amorphous waxes; and said coupling agent is amine silane.

11. Glass fibers having at least a portion of their surfaces covered with the dried residue of a nonaqueous sizing composition according to claim 1.

12. The glass fiber of claim 11, wherein said nonaqueous sizing composition is the composition defined in claim 7.

13. The glass fiber of claim 11, wherein said nonaqueous sizing composition is the composition defined in claim 10.

14. Glass fibers of claim 11 wirecoated with polymer selected from the group consisting of polyamide, polypropylene, polycarbonate, polybutylterphalate.

15. A process for producing a glass fiber containing molding compound comprising the steps of:
   (a) forming glass fiber strand;
   (b) coating said glass fiber strand with the nonaqueous sizing composition of claim 1; and
   (c) applying a wirecoating of polymer resins to the glass fiber having at least a portion of its surface covered with the dried residue of the nonaqueous sizing composition of claim 1.

16. The process of claim 15, wherein the step of coating said glass fiber strand with the nonaqueous sizing composition is performed at high temperatures.

17. A nonaqueous sizing composition for application to glass reinforcing fibers comprising:
   a) one or more polycaprolactones as film formers; and
   b) an amine silane coupling agent.

18. Glass fibers having at least a portion of their surfaces covered with the dried residue of a nonaqueous sizing composition comprising:
   a) one or more polycaprolactones as film formers; and
   b) an amine silane coupling agent.

* * * * *